United States Patent
Buenting et al.

(10) Patent No.: US 10,273,005 B2
(45) Date of Patent: Apr. 30, 2019

(54) SIEVE BED RETENTION SYSTEM

(71) Applicant: Carleton Life Support Systems Inc., Davenport, IA (US)

(72) Inventors: Todd Buenting, Moline, IL (US); Lane Dicken, Long Grove, IA (US); Justin Weber, Davenport, IA (US)

(73) Assignee: Carleton Life Support Systems, Inc., Davenport, IA (US)

( * ) Notice: Subject to any disclaimer, the term of this patent is extended or adjusted under 35 U.S.C. 154(b) by 128 days.

(21) Appl. No.: 15/483,200

(22) Filed: Apr. 10, 2017

(65) Prior Publication Data

US 2017/0291708 A1 Oct. 12, 2017

Related U.S. Application Data

(60) Provisional application No. 62/320,976, filed on Apr. 11, 2016.

(51) Int. Cl.
*B01D 53/04* (2006.01)
*B64D 11/00* (2006.01)

(52) U.S. Cl.
CPC .......... *B64D 11/00* (2013.01); *B01D 53/0407* (2013.01); *B01D 53/0415* (2013.01); *B01D 2253/108* (2013.01); *B01D 2256/12* (2013.01); *B01D 2257/40* (2013.01); *B01D 2259/4575* (2013.01); *B64D 2231/02* (2013.01)

(58) Field of Classification Search
CPC .............. B01D 53/0407; B01D 53/04; B01D 2256/12; B01D 2257/40; B01D 2259/4575; B64D 11/00; B64D 2231/02

USPC .......................... 96/108, 134, 137, 139, 147
See application file for complete search history.

(56) References Cited

U.S. PATENT DOCUMENTS

| | | | | |
|---|---|---|---|---|
| 3,815,752 A | * | 6/1974 | Hoffman | B01D 29/00 210/266 |
| 4,636,315 A | * | 1/1987 | Allen, Jr. | B01D 15/14 210/198.2 |
| 4,737,170 A | | 4/1988 | Searle | |
| 4,826,510 A | | 5/1989 | McCombs | |
| 5,275,642 A | | 1/1994 | Bassine | |
| 5,427,609 A | * | 6/1995 | Zoglman | B01D 53/261 95/105 |

(Continued)

FOREIGN PATENT DOCUMENTS

EP 2 803 387 A2 11/2014
WO WO2016/052392 A1 4/2015

*Primary Examiner* — Frank M Lawrence, Jr.
(74) *Attorney, Agent, or Firm* — Woods Oviatt Gilman LLP; Katherine H. McGuire, Esq.

(57) ABSTRACT

A retention system for use within a molecular sieve unit includes a perforated plate having a top face and bottom face. The perforated plate is configured to be positioned atop a packed sieve bed proximate an outlet end cap of the molecular sieve unit. A skirt is coupled to the bottom face of the perforated plate and a biasing member is configured to engage the outlet end cap and the top face of the perforated plate. The biasing member urges the perforated plate against the packed sieve bed. The biasing member may be one or more wave springs thereby reducing the risk of losing sufficient biasing force against the perforated plate. In the event that a sufficient biasing force is lost, the skirt may operate as a failsafe so as to minimize or prevent tilting of the perforated plate within the housing.

19 Claims, 4 Drawing Sheets

(56) References Cited

U.S. PATENT DOCUMENTS

| | | | |
|---|---|---|---|
| 5,482,261 A * | 1/1996 | Ortega | F16F 3/06 |
| | | | 267/166 |
| 5,531,807 A | 7/1996 | McCombs | |
| 5,620,507 A * | 4/1997 | Oborne | A62B 7/14 |
| | | | 55/475 |
| 6,334,889 B1 | 1/2002 | Smolarek et al. | |
| 6,484,413 B1 * | 11/2002 | Larsson | B01D 53/0415 |
| | | | 34/73 |
| 6,681,807 B1 | 1/2004 | Byrd | |
| 6,730,143 B1 * | 5/2004 | Nichols | B01D 53/261 |
| | | | 95/118 |
| 7,066,985 B2 | 6/2006 | Deane et al. | |
| 7,135,059 B2 | 11/2006 | Deane et al. | |
| 7,753,996 B1 | 7/2010 | Deane et al. | |
| 8,221,532 B2 | 7/2012 | Carruthers et al. | |
| 9,089,801 B1 | 7/2015 | Gavlak et al. | |
| 9,248,389 B2 | 2/2016 | Maquet et al. | |
| 2002/0185008 A1 | 12/2002 | Anderson et al. | |
| 2009/0223370 A1 * | 9/2009 | Kosugi | B01D 53/0407 |
| | | | 96/126 |
| 2012/0006199 A1 | 1/2012 | McCombs et al. | |
| 2012/0118157 A1 * | 5/2012 | Eidenschink | B01D 53/261 |
| | | | 96/118 |
| 2013/0087046 A1 * | 4/2013 | Aumueller | B01D 53/0415 |
| | | | 96/118 |

\* cited by examiner

SIEVE BED RETENTION SYSTEM

FIELD OF THE INVENTION

The present invention relates to molecular sieve devices, and more particularly to a molecular sieve retention system to contain and pack particulate material within a molecular sieve unit, and still more particularly to a molecular sieve retention system to contain and pack the particulate material within the molecular sieve unit even after the molecular sieve unit experiences extreme environmental conditions.

BACKGROUND OF THE INVENTION

Aircraft On-Board Oxygen Generation Systems/On-Board Inert Gas Generation Systems (OBOGS/OBIGGS) units are designed to separate gases from a pressurized air source in order to supply oxygen enriched air flow to the flight crew, while also supplying oxygen depleted air flow for inerting the fuel tank ullages. Such units typically employ molecular sieve gas separation processes, such as but not limited to pressure swing adsorption (PSA), wherein molecular sieve particulate material, such as a zeolite, is packed as a bed and retained within a molecular sieve unit. The sieve unit includes a housing, an inlet end cap, an outlet end cap and the sieve bed packed therein. A pressurized inlet gas may then enter through the inlet end cap, pass through the sieve bed wherein the inlet gas is separated by virtue of the sieve material such that unwanted components of the inlet air (e.g., $N_2$) are selectively adsorbed by the sieve material while a desired product gas (e.g., $O_2$) may pass through the sieve material and exit through the outlet end cap.

To prevent unwanted movement of the particulate material of the sieve bed within the housing, traditional sieve housings include a plate and spring retention system where the spring provides a downward force upon the plate to maintain a compact bed. Such a force acts to inhibit the formation of gaps through which unwanted components of the inlet air may traverse the length of the housing rather than be adsorbed by the particulate material of the sieve bed. The challenge is to provide sufficient downward force upon the packed bed so that the sieve particles do not move relative to each other under severe application conditions while also avoiding force levels that crush the particles. The probability of achieving this condition is increased dramatically when the compaction force applied to the sieve bed is uniform across the cross sectional area that it is applied. With that in mind, previous sieve beds have utilized conical springs coupled to a perforated plate to provide the compaction force to spread the load to the packed bed. However, under extreme environmental conditions, the packed bed and its retention system may be subject to forces that can cause rocking and or tilting of the perforated plate, which can in turn result in movement of the packed bed and subsequent damage to the molecular sieve unit. The risk of this type of failure increases if there is even a slight misalignment of the perforated plate or spring during assembly.

Therefore, a need remains for a molecular sieve retention system which can withstand the forces experienced due to extreme environmental conditions without risk of material bed damage and/or loss of sieve material retention.

SUMMARY OF THE INVENTION

The present invention is generally directed to a retention system for use within a molecular sieve unit. The molecular sieve unit includes a housing sealed at a first end via an inlet end cap having an inlet orifice defined therein and at a second end via an outlet end cap having an outlet orifice defined therein. The housing is further configured to retain a packed sieve bed of adsorptive material. The retention system may comprise a perforated plate having a top face and bottom face, wherein the perforated plate may be configured to be positioned atop the packed sieve bed proximate the outlet end cap; a skirt coupled to the bottom face of the perforated plate; and a biasing member configured to engage the outlet end cap and the top face of the perforated plate, wherein the biasing member urges the perforated plate against the packed sieve bed. The retention system may further comprise a felt filter and/or mesh screen configured to be interposed between the perforated plate and the packed sieve bed. At least a portion of the felt filter and/or mesh screen may also be interposed between the perforated plate and the skirt. In one aspect of the present invention, the biasing member may comprise a wave spring. In another aspect, the biasing member may comprise a wave spring assembly including two wave springs, wherein a first spring is centrally located within a second spring.

In a further aspect of the present invention, the skirt may further include one or more alignment components configured to be interposed between the skirt and an internal wall of the housing. Each of the one or more alignment components may be an O-ring. An inner surface of the skirt may also be configured to direct the adsorptive material proximate the housing centrally inward toward a central axis of the housing.

In another aspect of the present invention, a molecular sieve unit comprises a housing sealed at a first end via an inlet end cap having an inlet orifice defined therein and at a second end via an outlet end cap having an outlet orifice defined therein. A packed sieve bed of adsorptive material may be disposed within the housing and a retention system may be positioned between the packed sieve bed and the outlet end cap. The retention system may comprise a perforated plate having a top face and bottom face, wherein the perforated plate may be positioned atop the packed sieve bed proximate the outlet end cap; a skirt coupled to the bottom face of the perforated plate; and a biasing member configured to engage the outlet end cap and the top face of the perforated plate, wherein the biasing member urges the perforated plate against the packed sieve bed.

In still a further aspect of the present invention, a retention system for use within a molecular sieve unit may comprise a perforated plate having a top face and bottom face, wherein the perforated plate may be configured to be positioned atop the packed sieve bed proximate the outlet end cap; a skirt coupled to the bottom face of the perforated plate, wherein the skirt includes one or more alignment components configured to be interposed between the skirt and an internal wall of the housing; a biasing member configured to engage the outlet end cap and the top face of the perforated plate, wherein the biasing member urges the perforated plate against the packed sieve bed; and a felt filter and/or mesh screen configured to be interposed between the perforated plate and the packed sieve bed.

Additional objects, advantages and novel aspects of the present invention will be set forth in part in the description which follows, and will in part become apparent to those in the practice of the invention, when considered with the attached figures.

DETAILED DESCRIPTION

Figure 1:
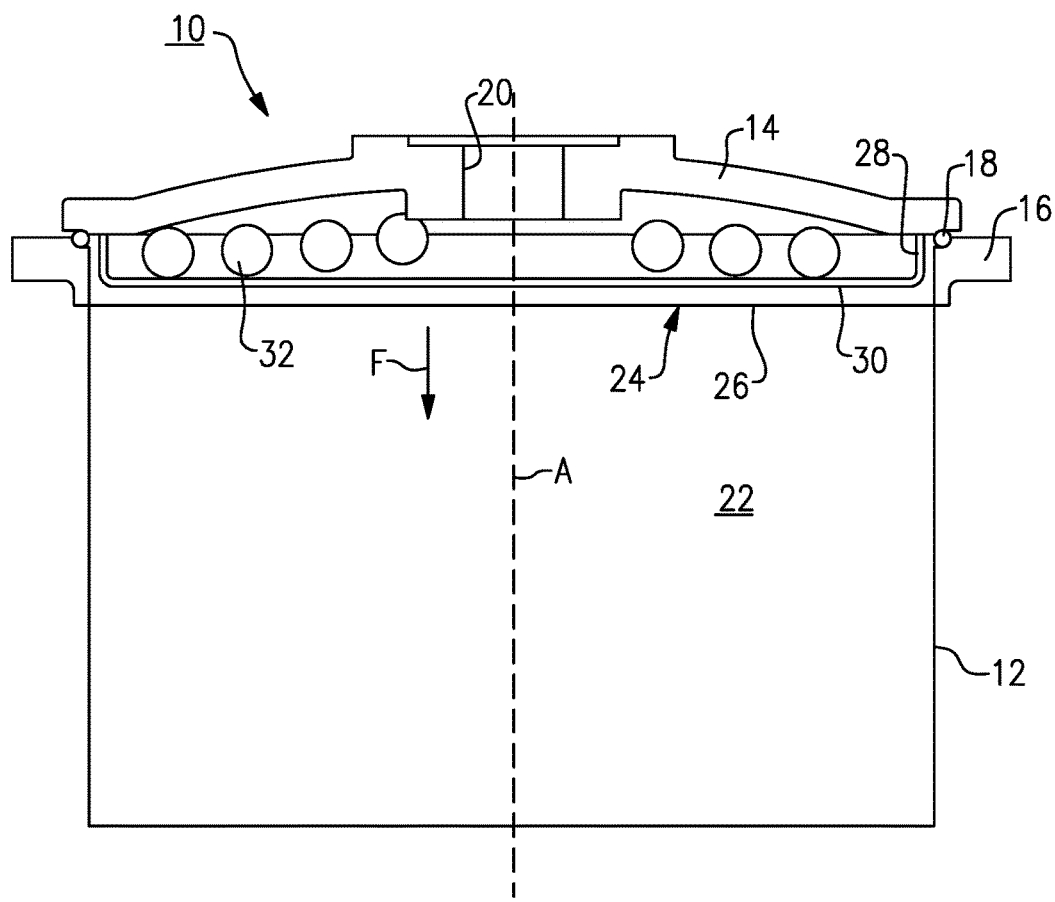
FIG. 1 is a cross section partial view of a prior art molecular sieve unit.

Referring now to FIG. 1 a prior art molecular sieve unit 10 generally comprises a tubular-shaped bed housing 12 capped by an inlet end cap at a first end (not shown) and opposing outlet end cap 14 at a second end 16. Each end may be sealed with its respective end cap, such as through use of an O-ring seal 18. Each end cap may further include a respective inlet or outlet orifice, such as outlet orifice 20 of outlet end cap 14. A sieve bed 22 of adsorptive material (e.g., zeolite) may be located within bed housing 12 between the inlet end cap and outlet end cap 14. In this manner, a pressurized air flow of inlet air may enter molecular sieve unit 10 through the inlet orifice of the inlet end cap, pass through the adsorptive material of sieve bed 22 whereby a desired product gas may be output through outlet orifice 20 of outlet end cap 14. In one aspect of the invention, the adsorptive material is configured to selectively remove unwanted constituents (e.g., $N_2$) from an air supply so as to output a desired product gas (e.g., $O_2$).

A bed retention system 24 may be positioned within housing 12 above bed 22 and be configured to cooperate with outlet end cap 14. Bed retention system 24 may include a felt filter and/or mesh screen (hereinafter, felt screen) 26 layered atop sieve bed 22, with a perforated plate 28 arranged to seat atop felt filter 26 along plate bottom face 30. Felt filter 26 may prevent adsorptive material from escaping from bed 22 by traveling through perforations within perforated plate 28. A conical spring 32 may be interposed between perforated plate 28 and outlet end cap 14 wherein conical spring 32 is biased to impart a downward force (indicated by arrow F) upon perforated plate 28 (toward the opposing inlet end cap) so as to maintain a compact sieve bed 22 within bed housing 12. A compact sieve bed 22 is desired as any gaps within the adsorptive material may provide a fluid path through which the pressurized inlet air may flow without undergoing gas separation. As a result, unwanted components may remain in the product gas, thereby reducing air separation efficiency and potentially producing hazardous or deadly product gases. Conversely, packing a sieve bed 22 under too great a force may crush the adsorptive material, thereby reducing the number of, and availability to, active sights for gas separation on or within the adsorptive material (i.e., zeolite). Again, this situation may result in unwanted components remaining in the product gas.

With continued reference to FIG. 1, adsorptive material of sieve bed 22 may settle or compact over time, and in certain environments, a molecular sieve unit, such as unit 10, may be subject to extreme stresses, such as vibrations, particularly when installed within an OBOGS/OBIGGS unit of an aircraft, and more particularly when installed within a military aircraft. When subjected to such vibrations, the adsorptive material (i.e., zeolite) comprising sieve bed 22 may become further compacted thereby creating cracks and gaps within the bed. To prevent cracks and gaps from forming, molecular sieve unit 10 may include conical spring 32 configured to bias perforated plate 28 toward the inlet end cap while maintaining plate orientation and material containment. However, should sieve bed 22 continue to compact to such a degree that the spring force imparted by conical spring 32 is insufficient to maintain compaction of the bed via perforated plate 28, bed retention system 24 may fail. In one instance, cracks and gaps may form which may decrease the air separation efficiency of the molecular sieve unit, potentially to an unsafe level. In a second instance, perforated plate 28 may tilt (i.e., no longer remain perpendicular to longitudinal axis A of bed housing 12) such that particulate adsorptive material of sieve bed 22 may be released from molecular sieve unit 10, such as through outlet orifice 20. Such a release would signal a catastrophic failure of molecular sieve unit 10.

Figure 2:
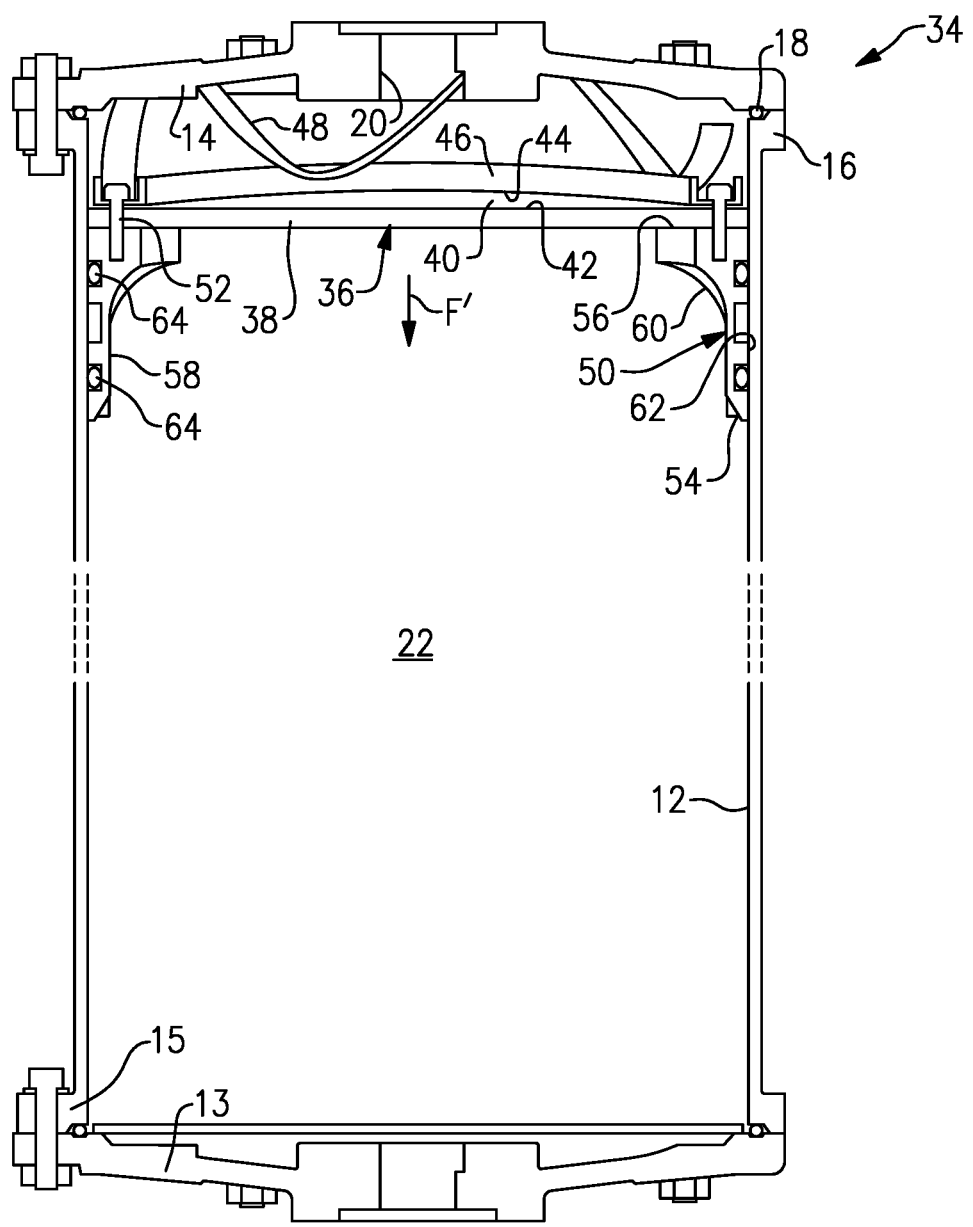
FIG. 2 is a cross section partial view of a molecular sieve unit in accordance with an aspect of the present invention.

Turning now to FIG. 2, a molecular sieve unit 34 in accordance with the present invention may generally include a housing 12 configured to receive a bed retention system 36. Similar to molecular sieve unit 10 described above, molecular sieve unit 34 may generally comprise a tubular-shaped bed housing 12 capped by an inlet end cap 13 at a first end 15 and opposing outlet end cap 14 at a second end 16. Each end may be sealed with its respective end cap, such as through use of an O-ring seal 18. Each end cap may further include a respective inlet or outlet orifice, such as outlet orifice 20 of outlet end cap 14. A sieve bed 22 of adsorptive material (e.g., zeolite) may located within bed housing 12 between the inlet end cap and outlet end cap 14. In this manner, a prior art bed retention system 24 may be swapped with bed retention system 36 without requiring modification of housing 12 or either end cap.

Figure 3:
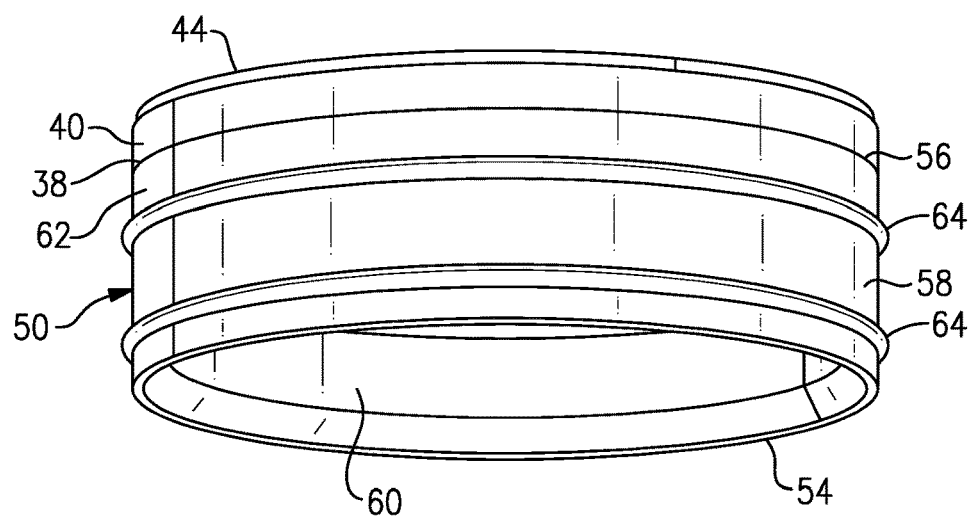
FIG. 3 is an isolated view of a perforated plate and skirt that may be used within the molecular sieve unit shown in FIG. 2.

As shown in FIGS. 2 and 3, bed retention system 36 may include a felt filter 38 configured to be layered atop sieve bed 22, with a perforated plate 40 arranged to seat atop felt filter 38 along plate bottom face 42. Felt filter 38 may prevent adsorptive material from escaping from bed 22 by traveling through perforations within perforated plate 40. Washer 44 may be arranged atop plate top face 46 of perforated plate 40 and opposite felt filter 38. A biasing member, such as wave spring 48, may be interposed between perforated plate 40 (or washer 44, when included) and outlet end cap 14. Wave spring 48 is biased to impart a downward force (indicated by arrow F') upon perforated plate 40/washer 44 toward the opposing inlet end cap so as to maintain a compact sieve bed 22 within bed housing 12.

Skirt 50 may be coupled to plate bottom face 42 by fasteners 52, such as but not limited to screws, bolts or rivets. Skirt 50 may include an open bottom end 54 and open top end 56 defining a side wall 58 therebetween. Inner surface 60 of side wall 58 may be configured to form a cup-like shape while external surface 62 may also include one or more alignment components 64. By way of example and without limitation thereto, alignment components 64 may include one or more O-rings. In accordance with an aspect of the present invention, skirt 50 along with alignment component(s) 64 may be configured to assist maintaining a perpendicular orientation of perforated plate 40 relative to the walls of housing 12. Alignment component(s) 64 may further maintain an airtight seal between external surface 62 of skirt 50 and housing 12. Without subscribing to any particular theory of operation, inner surface 60 may operate to capture adsorptive material of sieve bed 22 at the outer circumference of sieve bed 22 and direct the adsorptive material towards the center of perforated plate 40. This movement may assist leveling of the absorptive material within sieve bed 22, keep the adsorptive material from clumping or cracking, as well as alleviate any forces which may cause rocking or tilting of perforated plate 40.

Figure 4:
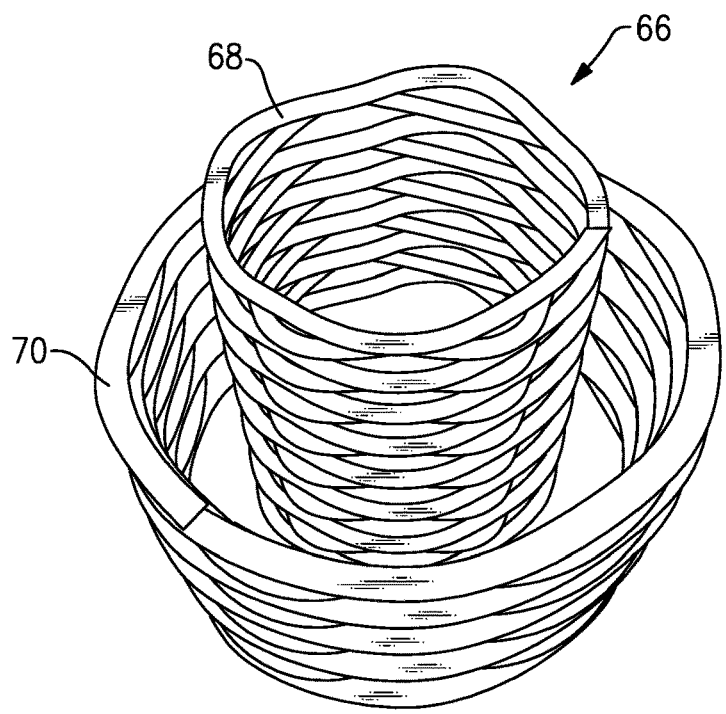
FIG. 4 is a perspective view of a concentric spring apparatus that may be used within the molecular sieve unit shown in FIG. 2.

In accordance with a further embodiment of the present invention, and as shown in FIG. 4, wave spring 48 of bed retention system 36 may be replaced with wave spring assembly 66. Assembly 66 may incorporate first and second wave springs 68, 70 in which first wave spring 68 may be centrally located within second wave spring 70. This configuration may promote uniformity of spring force F' (FIG. 2) applied to perforated plate 40 (and/or washer 44). The uniform spring force F' may then be applied to sieve bed 22, thereby further alleviating any potential rocking or tilting of perforated plate 40. It should be understood by those skilled in the art that, while being shown and described as a pair of concentrically oriented wave springs, any number of wave springs may be included within wave spring assembly 66, such as may be dictated by system requirements or housing capacities. It should be further appreciated that each of wave springs 48, 68, 70 may be manufactured from pre-hardened flat wire through an on-edge-coiling/edgewinding process. Moreover, while shown and described as wave springs, it should be appreciated by those skilled in the art that any suitable biasing member may be utilized, such as but not limited to coil springs or conical springs, and that such other and additional biasing members are to be considered within the scope of the present disclosure. With that being said, the exemplary wave spring 48 (or alternatively wave springs 68, 70) of molecular sieve unit 34 has less mass than corresponding conical or coil springs while also providing an increased free length for greater spring travel.

Figure 5:
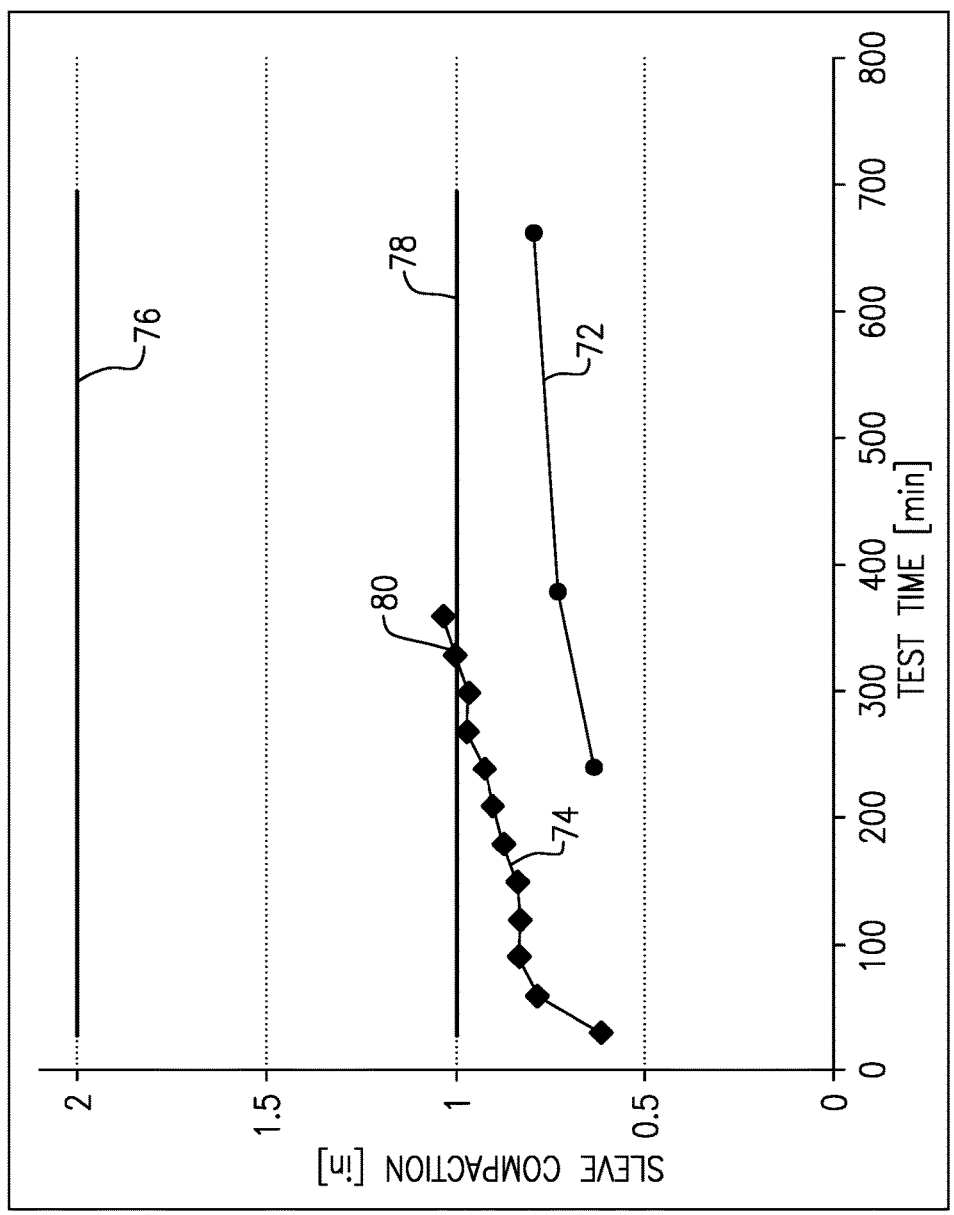
FIG. 5 is a graph depicting sieve compaction versus time during a vibration event comparing the prior art molecular sieve unit shown in FIG. 1 with the molecular sieve unit in accordance with the present invention as shown in FIG. 2.

Turning now to FIG. 5, sieve compaction 72 of a molecular sieve unit 34 in accordance with the present invention is compared with sieve compaction 74 of a prior art molecular sieve unit 10 as shown in FIG. 1 when subject to random vibrations typically experienced when such molecular sieve units may be deployed within a military aircraft. It should be noted that one minute of test time corresponds generally to one hour of unit flight time. It should be further noted that use of a wave spring/wave spring assembly extends the spring limit 76 compared to spring limit 78 of conical springs (spring limits indicate the point where the spring force is inadequate to maintain a compact sieve bed). As can be seen within FIG. 5, prior art molecular sieve unit 10 has experienced sieve bed compaction greater than its spring limit at approximately 350 minutes of test time, thus indicating molecular sieve unit failure, as indicated at reference numeral 80. In contrast, sieve compaction employing a bed retention system of the present invention, such as bed retention system 36, failure of molecular sieve unit 34 was avoided even after nearly 700 minutes of test time. Accordingly, failure of molecular sieve unit 34 due to vibrational compaction of sieve bed 22 may be greatly reduced, if not eliminated, when employing a bed retention system in accordance with the present invention.

The foregoing description of the invention has been presented for the purpose of illustration and description. It is not intended to be exhaustive nor is it intended to limit the invention to the precise form(s) disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A retention system for a molecular sieve unit, the molecular sieve unit including a housing sealed at a first end via an inlet end cap having an inlet orifice defined therein and at a second end via an outlet end cap having an outlet orifice defined therein, the housing configured to retain a packed sieve bed of adsorptive material, the retention system comprising:
   a. a perforated plate having a top face and bottom face and a side edge extending therebetween, wherein the side edge is proportioned to be substantially equal to an internal diameter of the housing, wherein the perforated plate is configured to be positioned atop the packed sieve bed proximate the outlet end cap;
   b. a skirt coupled to the bottom face of the perforated plate along a top edge, wherein the skirt includes a side wall having a planar external surface extending from the top edge to a bottom edge and configured to slidably engage an interior surface of the housing and a concave inner surface configured to direct the adsorptive material proximate the housing interior surface centrally inward toward a central axis of the housing;
   c. a biasing member configured to engage the outlet end cap and the top face of the perforated plate, wherein the biasing member is configured to urge the perforated plate against the packed sieve bed; and
   d. a first alignment component configured to be interposed between the planar external surface of the skirt and the interior surface of the housing proximate the bottom edge of the skirt.

2. The retention system of claim 1 further comprising:
   e. a felt filter and/or mesh screen configured to be interposed between the perforated plate and the packed sieve bed.

3. The retention system of claim 2 wherein at least a portion of the felt filter and/or mesh screen is interposed between the perforated plate and the skirt.

4. The retention system of claim 1 wherein the skirt further includes a second alignment component configured to be interposed between the skirt and the interior surface of the housing proximate the perforated plate.

5. The retention system of claim 4 wherein each of the first and second alignment components is an O-ring.

6. The retention system of claim 1 wherein the biasing member comprises a wave spring.

7. The retention system of claim 1 wherein the biasing member comprises a wave spring assembly including two wave springs, wherein a first spring is centrally located within a second spring.

8. A molecular sieve unit comprising:
   a. a housing sealed at a first end via an inlet end cap having an inlet orifice defined therein and at a second end via an outlet end cap having an outlet orifice defined therein;
   b. a packed sieve bed of adsorptive material disposed within the housing; and
   c. a retention system positioned between the packed sieve bed and the outlet end cap, the retention system comprising:
      i. a perforated plate having a top face and bottom face and a side edge extending therebetween, wherein the side edge is proportioned to be substantially equal to an internal diameter of the housing, wherein the perforated plate is positioned atop the packed sieve bed proximate the outlet end cap;

ii. a skirt coupled to the bottom face of the perforated plate along a top edge, wherein the skirt includes a side wall having a planar external surface extending from the top edge to a bottom edge and configured to slidably engage an interior surface of the housing and a concave inner surface configured to direct the adsorptive material proximate the housing interior surface centrally inward toward a central axis of the housing;

iii. a biasing member configured to engage the outlet end cap and the top face of the perforated plate, wherein the biasing member urges the perforated plate against the packed sieve bed; and iv. a first alignment component configured to be interposed between the planar external surface of the skirt and the interior surface of the housing proximate the bottom edge of the skirt.

9. The molecular sieve unit of claim 8 wherein the retention system further comprises:

v. a felt filter and/or mesh screen interposed between the perforated plate and the packed sieve bed.

10. The molecular sieve unit of claim 9 wherein at least a portion of the felt filter and/or mesh screen is interposed between the perforated plate and the skirt.

11. The molecular sieve unit of claim 8 wherein the skirt further includes a second alignment component configured to be interposed between the skirt and the interior surface of the housing proximate the perforated plate.

12. The molecular sieve unit of claim 11 wherein each of the first and second alignment components is an O-ring.

13. The molecular sieve unit of claim 8 wherein the biasing member comprises a wave spring.

14. The molecular sieve unit of claim 8 wherein the biasing member comprises two wave springs, wherein a first spring is centrally located within a second spring.

15. A retention system for a molecular sieve unit, the molecular sieve unit including a housing sealed at a first end via an inlet end cap having an inlet orifice defined therein and at a second end via an outlet end cap having an outlet orifice defined therein, the housing configured to retain a packed sieve bed of adsorptive material, the retention system comprising:

a. a perforated plate having a top face and bottom face and a side edge extending therebetween, wherein the side edge is proportioned to be substantially equal to an internal diameter of the housing, wherein the perforated plate is configured to be positioned atop the packed sieve bed proximate the outlet end cap;

b. a skirt coupled to the bottom face of the perforated plate along a top edge, wherein the skirt includes a side wall having a planar external surface extending from the top edge to a bottom edge and configured to slidably engage an interior surface of the housing and a concave inner surface configured to direct the adsorptive material proximate the housing interior surface centrally inward toward a central axis of the housing, wherein the skirt includes a first alignment component configured to be interposed between the planar external surface of the skirt and the interior surface of the housing proximate the bottom edge of the skirt;

c. a biasing member configured to engage the outlet end cap and the top face of the perforated plate, wherein the biasing member urges the perforated plate against the packed sieve bed; and d. a felt filter and/or mesh screen configured to be interposed between the perforated plate and the packed sieve bed.

16. The retention system of claim 15 wherein at least a portion of the felt filter and/or mesh screen is interposed between the perforated plate and the skirt.

17. The retention system of claim 15 wherein the biasing member comprises a wave spring.

18. The retention system of claim 15 wherein the skirt further includes a second alignment component configured to be interposed between the skirt and the interior surface of the housing proximate the perforated plate.

19. The molecular sieve unit of claim 18 wherein each of the first and second alignment components is an O-ring.

* * * * *